(12) United States Patent
Hashimoto

(10) Patent No.: US 10,691,555 B2
(45) Date of Patent: Jun. 23, 2020

(54) ELECTRONIC DEVICE

(71) Applicant: Panasonic Intellectual Property Management Co., Ltd., Osaka (JP)

(72) Inventor: Shingo Hashimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 207 days.

(21) Appl. No.: 15/997,537

(22) Filed: Jun. 4, 2018

(65) Prior Publication Data
US 2019/0018739 A1    Jan. 17, 2019

(30) Foreign Application Priority Data

Jul. 14, 2017   (JP) .................................. 2017-138471
Mar. 12, 2018   (JP) .................................. 2018-043717

(51) Int. Cl.
*G06F 11/14* (2006.01)
*G06F 1/3212* (2019.01)
(Continued)

(52) U.S. Cl.
CPC ........ *G06F 11/1466* (2013.01); *G06F 1/3212* (2013.01); *H02J 7/0049* (2020.01);
(Continued)

(58) Field of Classification Search
CPC . G06F 1/30; G06F 1/32; G06F 1/3203; G06F 1/3206; G06F 1/3212; G06F 1/3228; G06F 1/3278; G06F 11/3062; G06F 11/1446; G06F 11/1458; G06F 11/461; G06F 11/1464; G06F 11/466; G06F 11/1469; G03B 2205/007; H04W 52/0209;
(Continued)

(56) References Cited

U.S. PATENT DOCUMENTS 7,225,353 B1 * 5/2007 Wong .................... G06F 1/30
713/300
7,472,300 B1 * 12/2008 Haustein ............ G06F 1/3215
713/323
(Continued)

FOREIGN PATENT DOCUMENTS

JP      10-143290     5/1998
JP    2005-237189    9/2005
(Continued)

*Primary Examiner* — Gabriel Chu
(74) *Attorney, Agent, or Firm* — Renner, Otto, Boisselle & Sklar, LLP

(57) ABSTRACT

This disclosure includes a battery, an electricity input part for receiving electricity supplied from an external device, a charging controller for charging the battery with the electricity having been supplied via the electricity input part, and a controller for controlling execution of automatic backup. When the electricity input part is connected to the external device and there is data to be subjected to the automatic backup, until the automatic backup is completed, the controller compares a remaining capacity of the battery with a threshold, and executes the automatic backup when the remaining capacity is higher than the threshold. The controller is configured not to execute the automatic backup when the remaining capacity is equal to or lower than the threshold.

8 Claims, 6 Drawing Sheets

(51) Int. Cl.
*H04W 52/02* (2009.01)
*H02J 7/00* (2006.01)
*G06F 1/30* (2006.01)

(52) U.S. Cl.
CPC ........... H04W 52/0261 (2013.01); *G06F 1/30* (2013.01); *H02J 7/0048* (2020.01)

(58) Field of Classification Search
CPC ......... H04W 52/0225; H04W 52/0251; H04W 52/0258; H04W 52/0261; H04W 52/0264; H04W 52/0274; H04W 52/0277; H04W 52/028; H02J 7/0032; H02J 7/0048; H02J 7/0049

See application file for complete search history.

(56) References Cited

U.S. PATENT DOCUMENTS

| | | | | |
|---|---|---|---|---|
| 8,332,678 | B1* | 12/2012 | Mahalingam | G06F 11/3062 |
| | | | | 713/340 |
| 8,494,478 | B1* | 7/2013 | Ponnangath | G06F 11/1464 |
| | | | | 455/343.1 |
| 2005/0063119 | A1* | 3/2005 | Dowe | G03B 7/26 |
| | | | | 361/92 |
| 2005/0162132 | A1 | 7/2005 | Nagasawa | |
| 2006/0069931 | A1* | 3/2006 | Shin | G06F 1/3203 |
| | | | | 713/300 |
| 2010/0115305 | A1* | 5/2010 | Ichikawa | G06F 1/3203 |
| | | | | 713/320 |
| 2012/0159210 | A1* | 6/2012 | Hosaka | G06F 1/3212 |
| | | | | 713/320 |
| 2012/0311366 | A1* | 12/2012 | Alsina | G06F 11/1458 |
| | | | | 713/340 |
| 2013/0272691 | A1 | 10/2013 | Yamaguchi | |
| 2014/0133257 | A1* | 5/2014 | Ahn | G11C 5/141 |
| | | | | 365/229 |
| 2017/0331329 | A1* | 11/2017 | Kim | H02J 50/12 |
| 2018/0059951 | A1* | 3/2018 | Ober | G06F 11/1076 |
| 2019/0132431 | A1* | 5/2019 | Ziv | H02J 7/025 |
| 2019/0182374 | A1* | 6/2019 | Park | H02J 7/045 |

FOREIGN PATENT DOCUMENTS

| | | |
|---|---|---|
| JP | 2010-128295 | 6/2010 |
| JP | 2013-240267 | 11/2013 |
| JP | 2016-029860 | 3/2016 |

* cited by examiner

FIG. 3

| STATE DURING POWER OFF | | STATE OF EACH PART | | | | |
|---|---|---|---|---|---|---|
| | | Bluetooth | Wi-Fi | CONTROLLER | LIQUID CRYSTAL MONITOR | POWER SWITCH |
| NORMAL POWER OFF | FIRST POWER OFF (Bluetooth SETTING: OFF) | OFF | OFF | OFF | OFF | OFF |
| | SECOND POWER OFF (Bluetooth SETTING: ON) | Standby | OFF | OFF | OFF | OFF |
| APPARENT OFF | | ON | ON | ON | OFF | OFF |

ELECTRONIC DEVICE

BACKGROUND

1. Technical Field

The present disclosure relates to an electronic device having a function of automatically backing up data.

2. Description of the Related Art

Unexamined Japanese Patent Publication No. 2016-29860 discloses an information device including: a connector connectable to a charging unit including a backup data storage; a charger for charging a secondary battery with electricity supplied from the charging unit connected to the connector; a storage for storing multiple pieces of data and pieces of priority information indicative of priorities of the multiple pieces of data; and a backup controller for executing, in an order according to the pieces of the priority information, a backup process of duplicating the pieces of data stored in the storage and causing the duplicated pieces of data to be stored in the backup data storage as backup data. In the information device, the charger charges the secondary battery to a predetermined charge capacity, and the backup controller executes the backup process after the secondary battery attains the predetermined charge capacity. According to this configuration, a piece of data having higher importance is backed up preferentially. This reduces the possibility of failing to back up important information.

SUMMARY

The present disclosure provides an electronic device that meets user's expectation regarding battery charging in relation to execution of an automatic backup function on data.

An aspect of the present disclosure is an electronic device configured to execute automatic backup of automatically transmitting, to a predetermined recording medium, data stored in the electronic device. The electronic device described above includes: a battery configured to supply electricity to drive the electronic device, the electricity having been charged in the battery; an electricity input part to be connected to an external device, the electricity input part being configured to receive the electricity supplied from the external device; a charging controller configured to charge the battery with the electricity having been supplied via the electricity input part; and a controller configured to control execution of the automatic backup.

In a case where the electricity input part is connected to the external device and there is data to be subjected to the automatic backup, until the automatic backup is completed, the controller compares a remaining capacity of the battery with a threshold. The controller is configured to execute the automatic backup when the remaining capacity of the battery is higher than the threshold. The controller is configured not to execute the automatic backup when the remaining capacity of the battery is equal to or lower than the threshold.

BRIEF DESCRIPTION OF THE DRAWINGS

FIG. 3 illustrates possible states of the digital camera that is powered off;

DETAILED DESCRIPTION

Hereinafter, exemplary embodiments will be described in detail with reference to the drawings as appropriate. However, descriptions in more detail than necessary may be omitted. For example, the detailed description of already well-known matters and the overlap description of substantially identical configurations may be omitted. This is intended to prevent the following description from becoming unnecessarily redundant and to facilitate understanding by those skilled in the art. Here, the inventor provides the attached drawings and the following description such that those skilled in the art can sufficiently understand the present disclosure, and therefore, they do not intend to restrict the subject matters of claims.

First Exemplary Embodiment

[1-1. Configuration]

Figure 1:
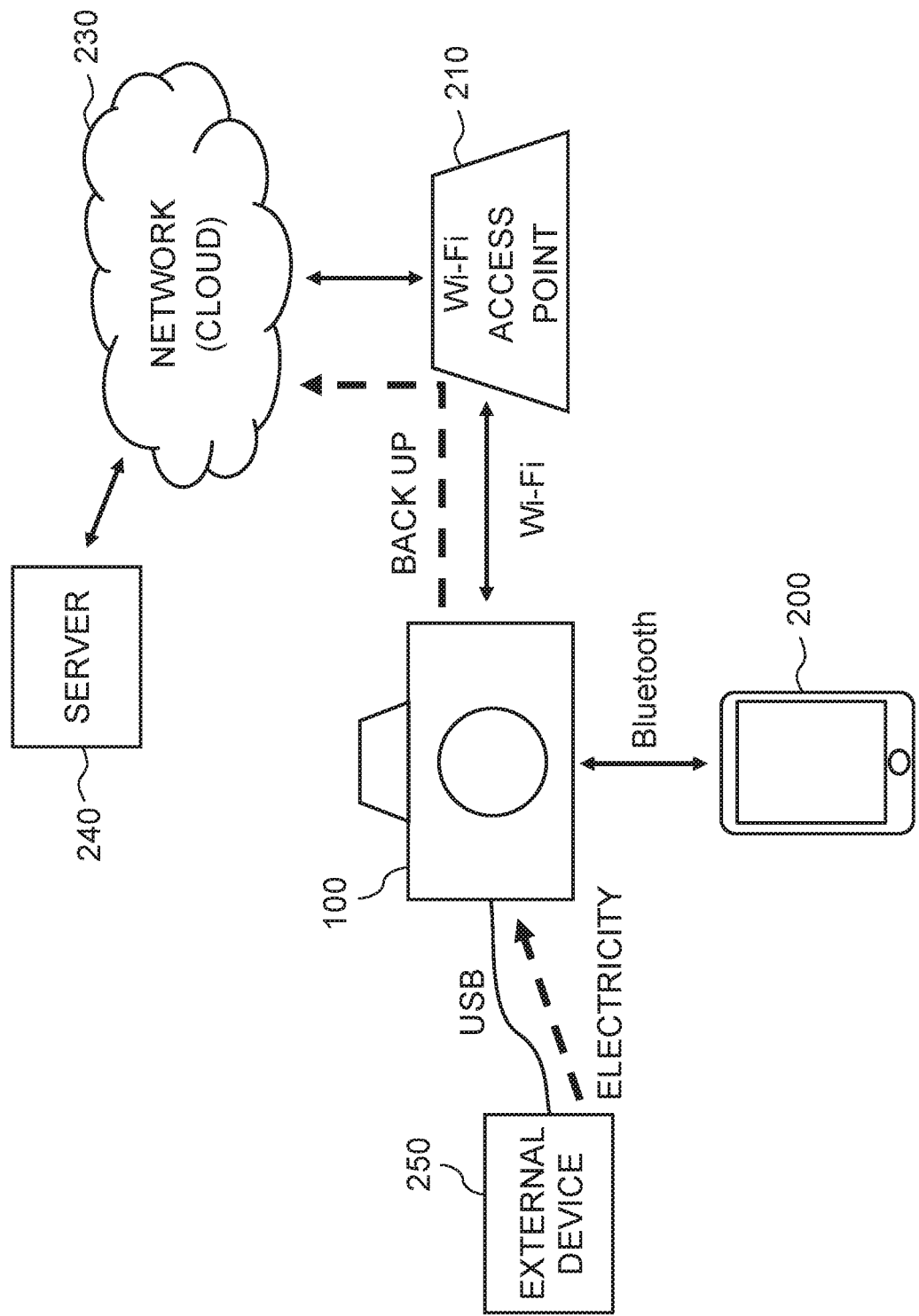
FIG. 1 illustrates a connection relation between a digital camera that is a first exemplary embodiment of the electronic device of the present disclosure and other devices.

FIG. 1 illustrates a connection relation between a digital camera that is a first exemplary embodiment of the electronic device of the present disclosure and other devices. Digital camera 100 is connectable to smartphone 200 via Bluetooth (Registered Trademark) communication. Digital camera 100 is connectable also to Wi-Fi access point 210. Digital camera 100 is connected to a network (for example, the Internet) 230 via Wi-Fi access point 210. In addition, digital camera 100 can communicate with server 240 connected to network 230. Digital camera 100 has a function (hereinafter, referred to as an automatic backup function) of automatically transmitting image data of a captured image to server 240 and saving the image data in server 240. In addition, digital camera 100 is connected to external device 250 via a universal serial bus (USB) cable. Digital camera 100 performs communication in compliance with an USB standard with external device 250, so that digital camera 100 can receive electricity from external device 250.

Figure 2:
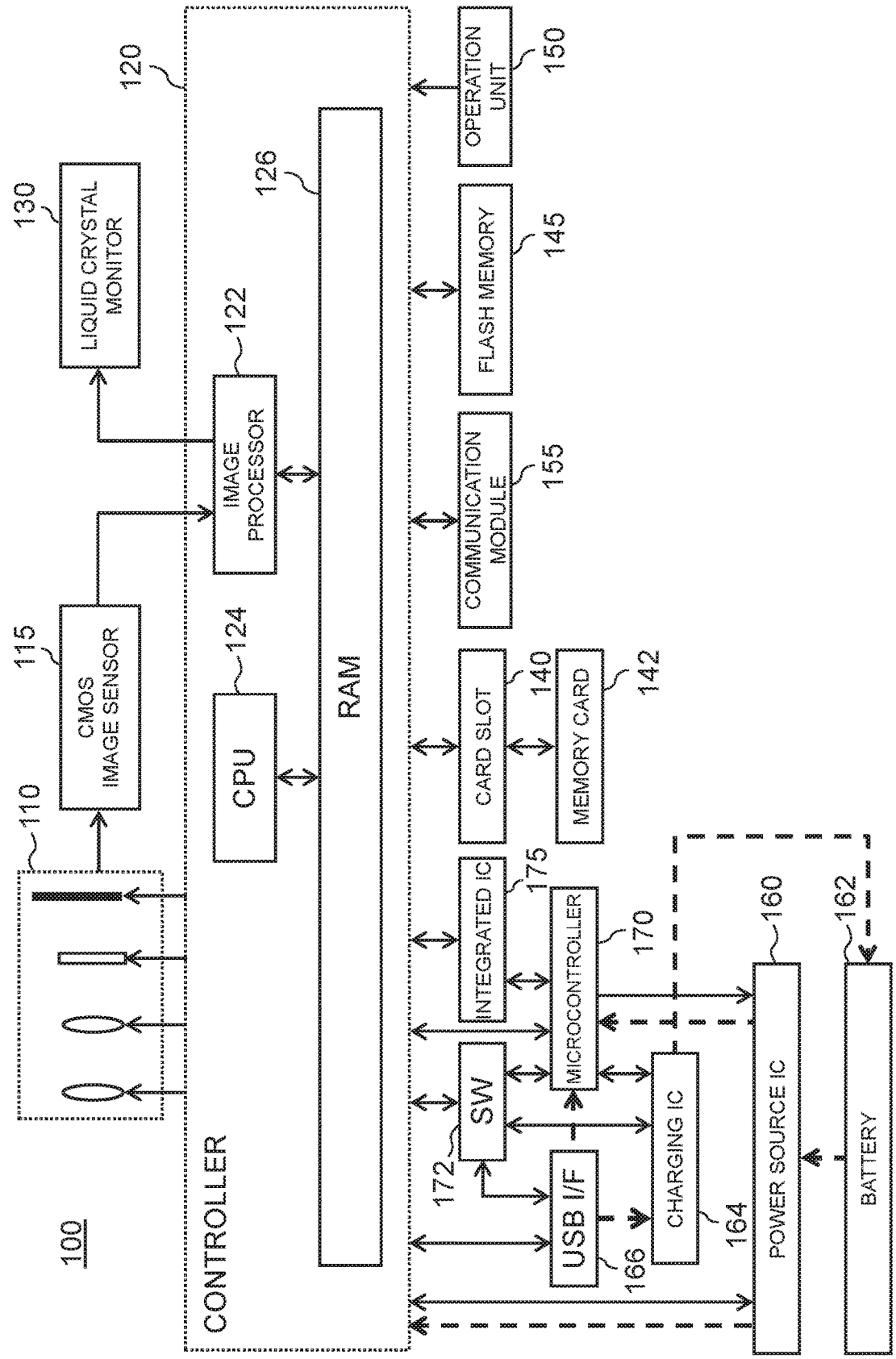
FIG. 2 is a block diagram illustrating a configuration of the digital camera.

FIG. 2 is a block diagram illustrating a configuration of digital camera 100. In FIG. 2, a solid line arrow indicates a flow of a signal, whereas a broken line arrow indicates a flow of electricity.

In digital camera 100, complementary metal oxide semiconductor (CMOS) image sensor 115 captures a subject image formed by optical system 110. CMOS image sensor 115 generates captured image data (raw data) based on the captured subject image. Image processor 122 of controller 120 performs various processes on the generated captured image data to generate image data. Controller 120 records the image data generated by image processor 122 in memory card 142 loaded in card slot 140. In addition, controller 120 can display (i.e., reproduce) the image data recorded in memory card 142 on liquid crystal monitor 130 in accordance with an operation on operation unit 150 performed by a user. Configurations of components of digital camera 100 will be described in detail below.

Optical system 110 includes, e.g., a focusing lens, a zoom lens, an optical camera-shake correction lens (or an optical image stabilizer (OIS)), an aperture, and a shutter. Optical system 110 may include any number of various lenses. Optical system 110 may include any number of lens units.

CMOS image sensor 115 captures a subject image formed by optical system 110 to generate captured image data. CMOS image sensor 115 generates image data of a new frame at a predetermined frame rate (for example, 30 frames per second). Controller 120 controls a captured image data generation timing and an electronic shutter operation for CMOS image sensor 115. The image capturing element is not limited to the CMOS image sensor. Alternatively, the image capturing element may be another image sensor such as a charge coupled device (CCD) image sensor or an n-channel metal-oxide semiconductor (NMOS) image sensor.

Controller 120 (one example of the controller) includes image processor 122, central processing unit (CPU) 124, and random access memory (RAM) 126. Image processor 122 performs various processes on the captured image data output from CMOS image sensor 115 to generate image data. Furthermore, image processor 122 performs various processes on the image data read from memory card 142 to generate an image to be displayed on liquid crystal monitor 130. The various processes may be, for example, at least one of white balance correction, gamma correction, YC conversion, electronic zoom, compression, and decompression; however, the various processes are not limited to such processes. Image processor 122 may be a hard-wired electronic circuit, a microcomputer using a program, or the like.

Controller 120 integrally controls, by CPU 124, entire operation of digital camera 100. Controller 120 may be made of a single semiconductor chip or a plurality of semiconductor chips. Although not illustrated in the drawings, controller 120 includes a read only memory (ROM). For example, a program for automatic focus control (AF control), a program for communication control, and a program for centralized control of entire operation of digital camera 100, each of which is executed by CPU 124, are stored in ROM. For example, an application for backup is stored in ROM. The application for backup is a program for transmitting an image captured by digital camera 100 to another device (for example, server 240) for saving the image in the device.

RAM 126 in controller 120 is a recording medium serving as a work area of CPU 124. RAM 126 is implemented by, for example, a dynamic random access memory (DRAM).

Liquid crystal monitor 130 is provided on a back of digital camera 100. Liquid crystal monitor 130 displays an image based on the image data processed by image processor 122. Note that, instead of the liquid crystal monitor, another monitor such as an organic electro-luminescence (EL) monitor may be used.

Memory card 142 is detachably inserted into card slot 140. Card slot 140 is capable of mechanically and electrically connecting memory card 142 and digital camera 100. Memory card 142 is an external memory including, in the inside of the external memory, a recording element such as a flash memory. Memory card 142 is capable of storing data such as image data generated by image processor 122.

Operation unit 150 is a general term for hard keys such as an operation button and an operation lever provided on an exterior of digital camera 100, and receives an operation performed by a user. Operation unit 150 may include, for example, at least one of a release button, a mode dial, a touch panel, a power switch, or a lever. Upon receipt of user's operation, operation unit 150 transmits an operation signal corresponding to the user's operation to controller 120.

Communication module 155 is a communication module performing communication in compliance with a predetermined communication standard. The communication module 155 may be a circuit. The communication standard includes, for example, at least any one of IEEE802.11, the Wi-Fi (Registered Trademark) standard, IEEE802.15.1 or the Bluetooth standard, or the near field communication NFC standard. In the present exemplary embodiment, digital camera 100 is capable of performing Bluetooth communication and Wi-Fi communication with another device via communication module 155. In communication module 155, controller 120 can set "on" (valid) or "off" (invalid) of each of the Bluetooth communication function and the Wi-Fi communication function.

Battery 162 is a power source for supplying electricity to each part of digital camera 100. Battery 162 is a rechargeable secondary battery such as a lithium-ion battery, a nickel-cadmium battery, or a nickel-metal hydride battery. Battery 162 can be charged with electricity having been supplied from external device 250 via the USB cable connected to USB interface 166.

Power source integrated circuit (IC) 160 is a circuit for supply, to each part of digital camera 100, power from battery 162. Charging IC 164 is a circuit for controlling charging of battery 162.

Integrated IC 175 is a circuit for performing various operations. For example, integrated IC 175 has a function of monitoring on/off of the power switch.

Microcontroller 170 is a circuit for controlling power supply in digital camera 100 and charging of battery 162.

USB interface 166 is an interface for establishing connection with an external device according to the USB standard. USB interface 166 includes a connector that complies with the USB standard and a circuit for performing communication in compliance with the USB standard.

Switch 172 is an analog switch for performing, under control of microcontroller 170, switchover of an output destination of a data signal (for example, a D+ signal or a D− signal) from USB interface 166 between controller 120, charging IC 164, and microcontroller 170.

[1-2. Operation]

An operation of digital camera 100 employing the above configuration will be described.

[1-2-1. Power Off State]

First, the following will describe a possible power off state of digital camera 100 of the present exemplary embodiment. FIG. 3 illustrates possible power off states of digital camera 100. In response to user's off-operation on the power switch, digital camera 100 stops electricity supply to at least part of the internal circuits. As the power off state at such a time, digital camera 100 has a "normal power off" state and an "apparent off" state, in which the power source appears to be off. In addition, the "normal power off" state includes a "first power off state", in which the Bluetooth setting is "off", and a "second power off" state, in which the Bluetooth setting is "on".

In the "first power off" state, in which the Bluetooth setting is "off", electricity supply to communication module 155, controller 120, and liquid crystal monitor 130 is stopped and the functions of communication module 155, controller 120, and liquid crystal monitor 130 are turned off.

In the "second power off" state, in which the Bluetooth setting is "on", electricity is supplied to communication module 155. At this time, the Bluetooth communication function is set in a standby mode, and the Wi-Fi communication function is set to off. Meanwhile, electricity supply to controller 120 and liquid crystal monitor 130 is stopped, and the functions of controller 120 and liquid crystal monitor 130 are turned off.

In the "apparent off" state, electricity is supplied to communication module 155, and the Bluetooth communication function and the Wi-Fi communication function are turned on. In addition, electricity is supplied also to controller 120, and controller 120 is turned on. However, electricity supply to liquid crystal monitor 130 is stopped. Thus, for the user, digital camera 100 seems to be powered off.

In response to user's off-operation on the power switch in the state where digital camera 100 is powered on, digital camera 100 is shifted to the "normal power off" state. If the Bluetooth setting is "on" at this time, digital camera 100 is shifted to the "second power off" state. Thus, as illustrated in FIG. 3, electricity supply to communication module 155 is not stopped, and the Bluetooth communication function is set in the standby mode.

In a case where smartphone 200 (one example of another electronic device) having been paired exists in the periphery of digital camera 100 in the "second power off" state, digital camera 100 establishes Bluetooth connection with the smartphone 200 via communication module 155. Upon receipt of an activation instruction from smartphone 200, controller 120 is activated, so that digital camera 100 is shifted from the "second power off" state to the "apparent off" state. At this time, liquid crystal monitor 130 is off. Thus, for the user, digital camera 100 seems to be powered off. In the manner described above, digital camera 100 is shifted from the "normal power off" state to the "apparent off" state.

[1-2-2. Automatic Cloud Backup]

Digital camera 100 has a function of automatically transmitting image data of a captured image to predetermined server 240 on network 230 for saving the image data in server 240 in a state where digital camera 100 is powered off. Hereinafter, this function is referred to as automatic cloud backup. The automatic cloud backup is one example of the automatic backup. Smartphone 200 connected to digital camera 100 gives an instruction to execute the automatic cloud backup.

The following will describe execution of the automatic cloud backup function of digital camera 100. Note that, in the description below, the Bluetooth setting is set to "on" in digital camera 100.

In response to user' operation on the power switch to power off digital camera 100, digital camera 100 is shifted to the "second power off" state. Consequently, electricity supply to controller 120 and liquid crystal monitor 130 is stopped (see FIG. 3). Meanwhile, electricity is supplied to communication module 155, and thus the Bluetooth function is in the standby mode.

In a case where smartphone 200 having been paired exists in the periphery of digital camera 100 in this state, digital camera 100 establishes Bluetooth connection with smartphone 200 via communication module 155. Upon establishment of the Bluetooth connection, smartphone 200 transmits, to digital camera 100, an instruction to activate controller 120. In response to this, digital camera 100 activates controller 120, so that digital camera 100 is shifted to the "apparent off" state. Furthermore, smartphone 200 instructs digital camera 100 to start the automatic cloud backup.

In response to this, controller 120 of digital camera 100 establishes Wi-Fi connection with Wi-Fi access point 210 that is in the periphery of digital camera 100, and starts the automatic cloud backup. Thus, image data of a captured image is automatically transmitted to and saved in server 240 on network 230 connected to digital camera 100 via Wi-Fi access point 210.

Figure 4:
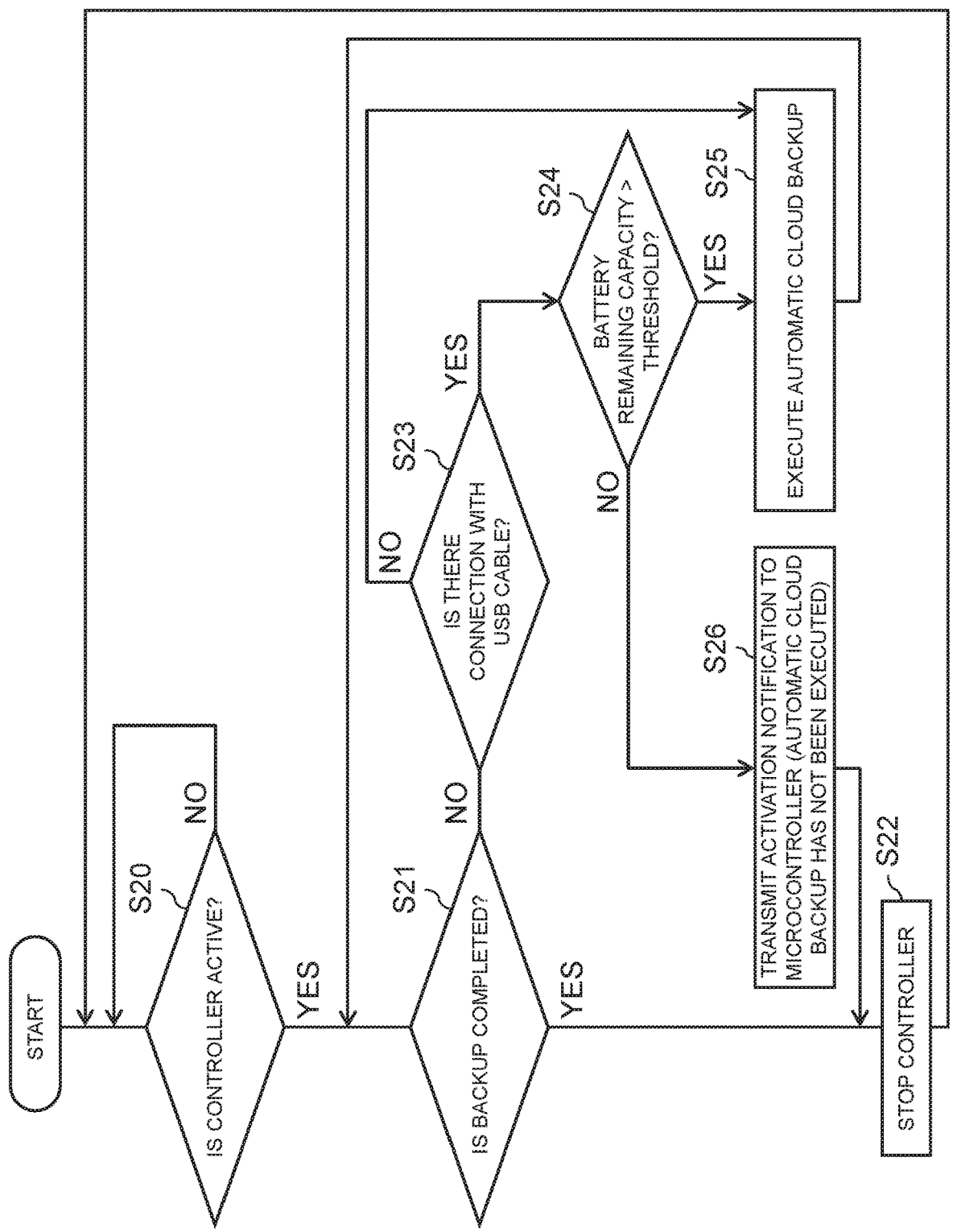
FIG. 4 is a flowchart illustrating an operation of a controller of the digital camera.

FIG. 4 is a flowchart of an operation regarding the automatic cloud backup to be executed by controller 120 of digital camera 100. With reference to FIG. 4, the following will describe an automatic cloud backup operation performed by controller 120. Note that, before processes illustrated in the flowchart of FIG. 4 are started, digital camera 100 is in the "second power off" state (the Bluetooth setting is in "ON") and Bluetooth connection between digital camera 100 and smartphone 200 has been established.

Digital camera 100 receives, from smartphone 200 with which digital camera 100 has established the Bluetooth connection, an instruction to activate controller 120, and activates controller 120 (S20).

Furthermore, digital camera 100 receives, from smartphone 200, an instruction to start the automatic cloud backup. Then, controller 120 starts the automatic cloud backup operation. First, controller 120 determines whether or not pieces of image data of captured images stored in digital camera 100 include a piece of data having not been backed up in the server yet (S21).

If there is no piece of image data having not been backed up yet (YES in S21), controller 120 is stopped. In this case, the automatic cloud backup is not executed.

If there is a piece of image data having not been backed up yet (NO in S21), controller 120 determines whether or not USB interface 166 is connected with a USB cable, based on the presence or absence of a voltage from the USB cable. Namely, controller 120 determines whether or not electricity is supplied to battery 162 from external device 250 via the USB cable inserted into USB interface 166 (S23).

If digital camera 100 is not connected to the USB cable and is not supplied with electricity from external device 250 (NO in S23), controller 120 executes the automatic cloud backup (S25). Meanwhile, if digital camera 100 is connected to the USB cable and is supplied with electricity from external device 250 (YES in S23), controller 120 determines whether or not a remaining capacity (charge capacity) of battery 162 is higher than a threshold (S24). The threshold is set at a value that is considered by a general user to be a sufficient remaining capacity (charge capacity) of battery 162. The way of selecting the threshold to be referred to in the determination of the battery remaining capacity will be described later.

If the remaining capacity of battery 162 is higher than the threshold (YES in S24), controller 120 executes the automatic cloud backup (S25). As a result of the automatic cloud backup, the piece of image data is automatically transmitted to server 240 for saving the piece of image data in server 240. Thus, in the case where the battery remaining capacity is determined to be sufficient, the automatic cloud backup is executed.

Meanwhile, if the remaining capacity of battery 162 is equal to or lower than the threshold (NO in S24), controller 120 transmits an activation notification to microcontroller 170 (S26). The activation notification is a command of instructing the microcontroller to activate controller 120 upon completion of charging of battery 162.

After controller 120 transmits the activation notification, controller 120 stops operating (S22). That is, controller 120 is shifted to the "second power off" state. After that, controller 120 returns to step S20, and controller 120 waits to be activated by microcontroller 170.

In the manner described above, if the remaining capacity of battery 162 is considered to be insufficient, controller 120 does not execute the automatic cloud backup and stops operating (namely, controller 120 is shifted to the "second power off" state). At this time, if digital camera 100 is connected to external device 250 via the USB cable and can receive electricity supplied from external device 250, charging of battery 162 is performed (this will be described in detail later).

Figure 5:
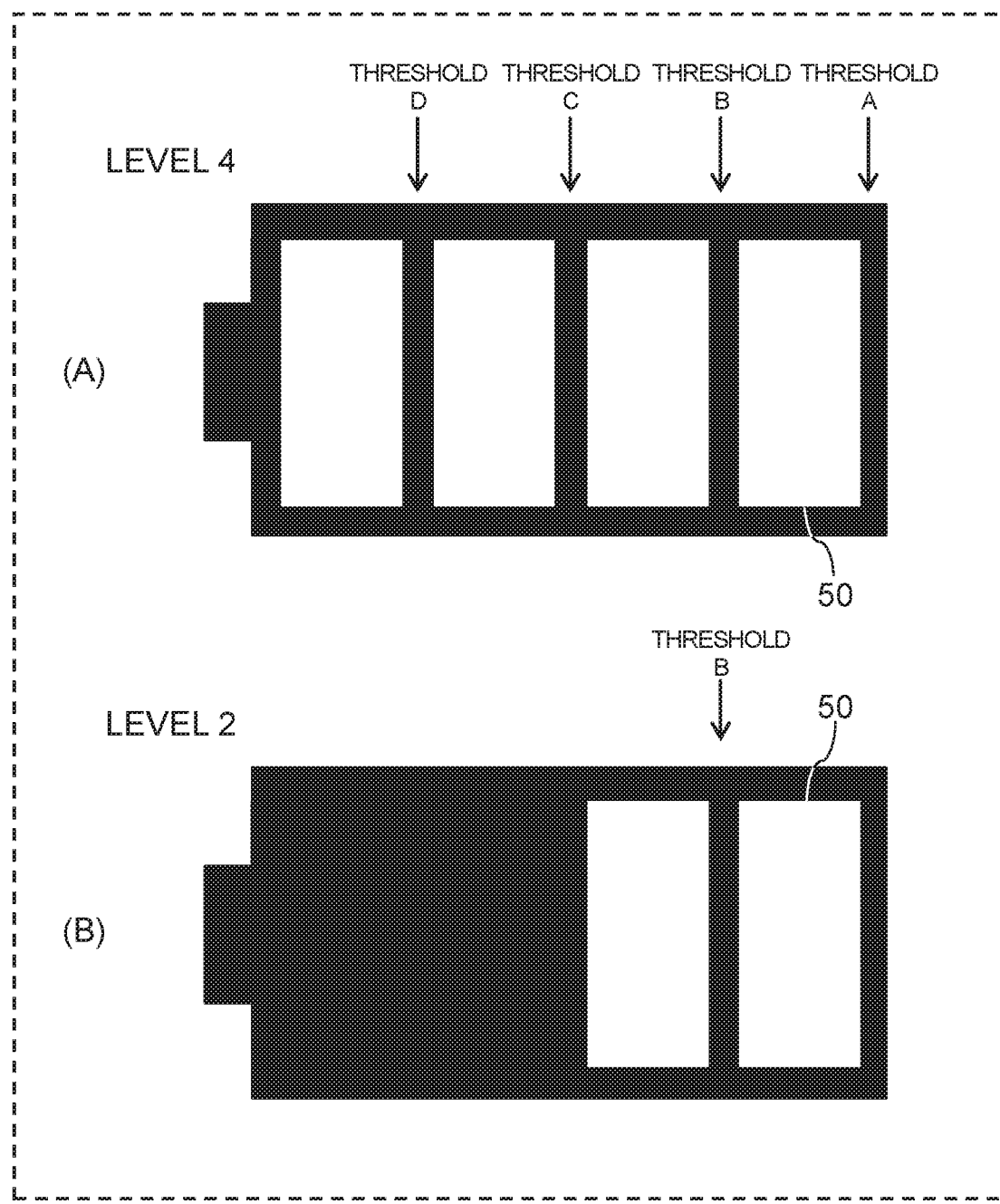
FIG. 5 shows views illustrating an icon indicative of a charged state of a battery.

Here, the threshold to be referred to in the determination in step S24 will be described. This threshold is set based on a threshold to be referred to for switchover of a battery remaining capacity indication (i.e., a remaining capacity level) displayed on liquid crystal display monitor 130 from one to another. Hereinafter, such a threshold is referred to as a level threshold. The level threshold is set in association with a battery remaining capacity. Each of parts (A) and (B) of FIG. 5 shows an indication of a battery remaining capacity displayed on liquid crystal monitor 130 of digital camera 100. The remaining capacity of battery 162 is indicated by the number of blocks 50 in a stepwise manner.

For example, the battery remaining capacity is displayed in five stages from level 0 to level 4. Level 0 denotes a state in which the remaining capacity of battery 162 is less than level threshold A. In level 0, no block 50 is displayed. Level 1 denotes a state in which the remaining capacity of battery 162 is equal to or higher than level threshold A and less than level threshold B. In level 1, one block 50 is displayed. Level 2 denotes a state in which the remaining capacity of battery 162 is equal to or higher than level threshold B and less than level threshold C. In level 2, two blocks 50 are displayed. Level 3 denotes a state in which the remaining capacity of battery 162 is equal to or higher than level threshold C and less than level threshold D. In level 3, three blocks 50 are displayed. Level 4 denotes a state in which the remaining capacity of battery 162 is equal to higher than level threshold D. In level 4, all four blocks 50 are displayed. Part (A) of FIG. 5 illustrates an example of display indicating that the battery remaining capacity is at level 4. Part (B) of FIG. 5 illustrates an example of display indicating that the battery remaining capacity is at level 2.

The threshold used in the determination in step S24 is set at, e.g., a value at which four blocks 50 are always displayed as a battery remaining capacity indication on liquid crystal monitor 130. For example, the threshold is set at level threshold D, which is referred to at the time of switchover between level 3 and level 4. Namely, the threshold used in step S24 is set to be equal to level threshold D that is between level 4 and level 3 among levels 0 to 4. The level 4 indicates that the battery has the highest remaining capacity, and level 3 indicates that the next highest remaining capacity following level 4. Consequently, it is possible to always show the user a state in which four blocks are displayed, and hence to cause the user to recognize that the battery remaining capacity is high.

Note that the threshold used in the determination in step S24 may be any of level thresholds A to D selected according to the use. In addition, the threshold may not be a fixed value, but may be a variation. For example, the threshold (corresponding to any one of level thresholds A to D, for example) set as the threshold used in the determination in step S24 may be switched over from one to another according to the battery remaining capacity measured when the USB cable is connected to digital camera 100.

Figure 6:
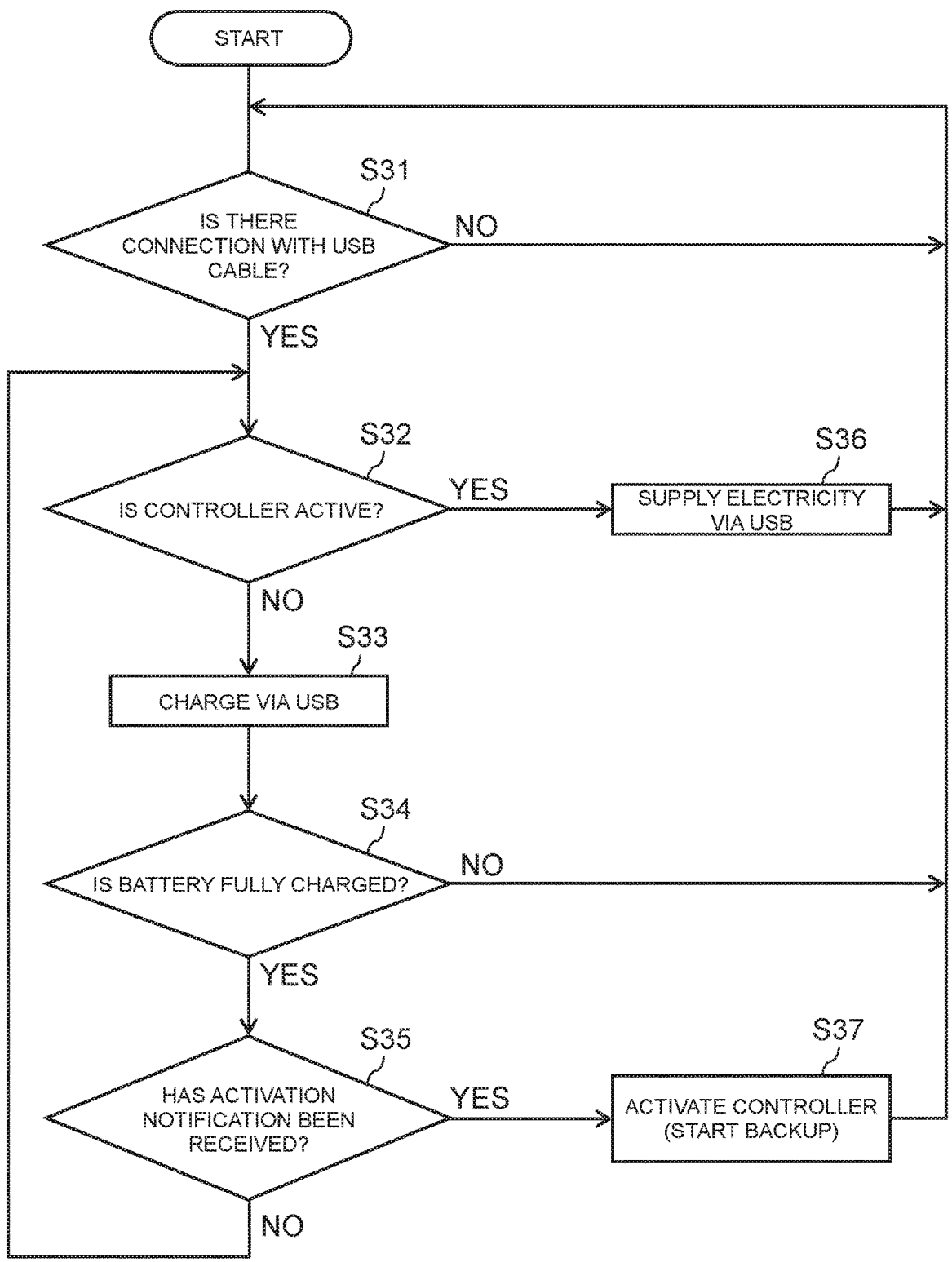
FIG. 6 is a flowchart illustrating an operation of a microcontroller of the digital camera.

FIG. 6 is a flowchart illustrating operations, performed by microcontroller 170 in digital camera 100, of electricity supply and charging by using electricity having been supplied via USB interface 166. With reference to FIG. 6, the following will describe a charging control and an electricity supply control performed by microcontroller 170.

Microcontroller 170 determines whether or not the USB cable is connected to USB interface 166, based on the presence or absence of a voltage from the USB cable (S31). To the USB cable, external device 250 capable of supplying electricity in compliance with the USB interface standard is connected. External device 250 is a personal computer (PC) or an AC adapter for charging, for example. In other words, in step S31, microcontroller 170 determines whether or not electricity supply from external device 250 via USB interface 166 is possible.

If the USB cable is not connected to USB interface 166, i.e., if digital camera 100 is not connected to external device 250 via the USB cable (NO in S31), there is no electricity supply via USB interface 166. Therefore, microcontroller 170 does not perform the operations of electricity supply and charging by using electricity having been supplied via USB interface 166. In this case, microcontroller 170 controls power source IC 160 so that electricity is supplied from battery 162 to controller 120.

Meanwhile, if USB interface 166 is connected to the USB cable (YES in S31), microcontroller 170 determines whether or not controller 120 is active (S32).

If controller 120 is active (YES in S32), microcontroller 170 supplies, to controller 120 and/or other components, electricity having been supplied via USB interface 166 (i.e., executes electricity supply via USB) (S36). For example, while the automatic cloud backup is under execution, controller 120 is active. Thus, electricity having been supplied via USB interface 166 is supplied to controller 120.

If controller 120 is not active (NO in S32), microcontroller 170 controls charging IC 164 so that battery 162 is charged (charged via USB) with electricity having been supplied via USB interface 166 (S33).

After that, microcontroller 170 determines whether or not battery 162 has been charged to a full charged state (S34). Until battery 162 attains the full charged state, the above processes (S31 to S34, S36) are repeated. In step S34, microcontroller 170 determines whether or not battery 162 has been charged to the full charged state. Alternatively, microcontroller 170 may determine whether or not the battery remaining capacity (charge capacity) has reached a predetermined level that is lower than the full charged state.

When battery 162 reaches the full charged state (YES in S34), microcontroller 170 determines whether or not microcontroller 170 has received an activation notification transmitted from controller 120 in S26 in FIG. 4 (S35).

If microcontroller 170 has not received the activation notification from controller 120 (NO in S35), microcontroller 170 returns to step S32 and performs the above processes again.

Meanwhile, if microcontroller 170 has received the activation notification from controller 120 (YES in S35), microcontroller 170 activates controller 120 to start the automatic cloud backup (S37). In the case where microcontroller 170 has received the activation notification, controller 120 is stopped without performing the automatic cloud backup (S22, S26), since the battery remaining capacity was equal to or lower than the predetermined value (NO in S24). However, at the time when controller 120 is activated again by microcontroller 170 (S37 in FIG. 6), battery 162 is in the full charged state. Therefore, according to the flowchart in FIG. 4, the processes in S21, S23, and S24 in FIG. 4 are performed, and then the automatic cloud backup is executed (S25).

By a combination of the automatic cloud backup control illustrated in FIG. 4 and the charging control illustrated in FIG. 6 as those described above, digital camera 100 operates as below during the automatic cloud backup.

If digital camera 100 includes a piece of image data to be backed up (NO in S21 in FIG. 4), controller 120 determines whether or not USB interface 166 is connected with SB cable (S23). If USB interface 166 is connected with the USB cable (YES in S23), controller 120 compares the remaining capacity of battery 162 with the threshold. If the remaining capacity of battery 162 is higher than the threshold (YES in S24), controller 120 executes the automatic cloud backup. Meanwhile, if the remaining capacity of battery 162 is equal to or lower than the threshold (NO in S24), controller 120 transmits an activation notification to microcontroller 170 (S26) and is stopped (S22).

Namely, while the remaining capacity of battery 162 is higher than the threshold, the automatic cloud backup is executed. Then, if the remaining capacity of battery 162 becomes lower than the threshold, the automatic cloud backup is stopped (S22). At this time, if the USB cable is connected to digital camera 100 (i.e., if external device 250 is connected to digital camera 100), battery 162 is charged via USB (S31 to S33 in FIG. 6).

After that, when battery 162 reaches the full charged state (YES in S34), if microcontroller 170 has received the activation notification from controller 120 (YES in S35), microcontroller 170 activates controller 120 (S37). At this time, battery 162 is in the full charged state and the remaining capacity of battery 162 is sufficient, and therefore the automatic cloud backup is executed (S25).

After that, if the remaining capacity of battery 162 is reduced due to electricity consumption by the automatic cloud backup operation and the remaining capacity becomes equal to or lower than the threshold, the automatic cloud backup is stopped and charging of battery 162 via USB is started again. The operation described above is repeated until the automatic cloud backup operation is completed.

As described above, when digital camera 100 is to execute the automatic cloud backup with digital camera 100 being connected to the USB cable, digital camera 100 executes the backup while the battery remaining capacity is higher than the threshold (e.g., if the remaining capacity is sufficient). However, while the battery remaining capacity is equal to or lower than the threshold (e.g., if the remaining capacity is insufficient), digital camera 100 gives priority to battery charging. Thus, digital camera 100 preferentially performs charging of battery 162, rather than execution of the backup. As described above, according to the charged state of battery 162, digital camera 100 flexibly selects a process to be preferentially performed.

When a user connects a USB cable to USB interface 166, the user expects that battery 162 will be charged. Therefore, if the automatic cloud backup is executed with a low battery remaining capacity and the backup is interrupted due to battery exhaustion before the backup is completed, the user's expectation as above will be betrayed. Also, if the battery remaining capacity is significantly low when the automatic cloud backup is completed, the user's expectation as above will be betrayed. As described above, the present exemplary embodiment controls a selection between the automatic cloud backup and the charging via USB, thereby making it possible to reduce a decrease in battery capacity, and hence to meet the user's expectation when the user connects the USB cable to digital camera 100.

[1-3. Effects and Other Remarks]

As described above, digital camera 100 is an electronic device capable of performing the automatic cloud backup (one example of the automatic backup) of automatically transmitting, to server 240 (one example of the recording medium), data stored in digital camera 100.

Digital camera 100 includes: battery 162 that is rechargeable and is configured to supply electricity to drive digital camera 100; USB interface 166 (one example of the electricity input part) that is to be connected to external device 250 and is configured to receive electricity supplied from external device 250; microcontroller 170 (one example of the charging controller) configured to charge battery 162 with electricity having been supplied via USB interface 166; and controller 120 (one example of the controller) configured to control automatic cloud backup.

In a case where USB interface 166 is connected to external device 250 and there is data to be subjected to the automatic cloud backup, until the automatic cloud backup is completed (namely, as long as the state in S21 is NO), a) controller 120 compares a remaining capacity of battery 162 with the threshold (S24);

b) controller 120 executes the automatic cloud backup (S25) if the remaining capacity of battery 162 is higher than the threshold (YES in S24); and c) controller 120 does not execute the automatic cloud backup (S22) if the remaining capacity of battery 162 is equal to or lower than the threshold (NO in S24).

With the arrangement described above, it is possible to reduce a decrease in the battery remaining capacity that may otherwise be caused by execution of the automatic cloud backup when the USB cable is connected to digital camera 100. Consequently, it is possible to meet the user's expectation that battery 162 will be charged when the user connects the USB cable to digital camera 100.

In a case where USB interface 166 is connected to external device 250 (YES in S31), microcontroller 170 charges battery 162 with electricity having been supplied via USB interface 166 (S33) while the remaining capacity of battery 162 is equal to or lower than the threshold and the automatic cloud backup is not under execution.

With the arrangement described above, in a case where the battery remaining capacity is low, it is possible to perform the charging preferentially to the automatic cloud backup. Consequently, it is possible to meet the user's expectation that battery 162 will be charged when the user connects the USB cable to digital camera 100.

In addition, if the remaining capacity of battery 162 is equal to or lower than the threshold (NO in S24), controller 120 transmits an activation notification (one example of the predetermined notification) to microcontroller 170 (S26) and stops operating (S22). When the charging of battery 162 (S33) is completed (YES in S34), if microcontroller 170 has received the activation notification (YES in S35), microcontroller 170 activates controller 120 (S37). Due to the arrangement in which controller 120 transmits the activation notification (predetermined notification) to microcontroller 170 in this manner, microcontroller 170 can recognize the necessity to activate controller 120 upon completion of the battery charging.

In a case where the USB cable (i.e., external device 250) is connected to USB interface 166 (YES in S31) and controller 120 is operating (YES in S32), microcontroller 170 supplies, to controller 120, electricity having been supplied via USB interface 166 (S36). Meanwhile, if controller 120 is stopped (NO in S32), microcontroller 170 charges battery 162 with electricity having been supplied via USB interface 166 (S33).

Digital camera 100 further includes a liquid crystal monitor 130 (one example of the display) configured to display the remaining capacity of battery 162 in multiple levels in a stepwise manner. The threshold is set to be equal to a threshold (hereinafter, referred to as a level threshold) for the battery remaining capacity, the threshold being to be referred to at the time of switchover among the multiple levels. Consequently, it is possible to always show the user a state in which a predetermined remaining capacity level (for example, a predetermined number of blocks) is displayed, and hence to cause the user to recognize that the battery has a certain level of the remaining capacity.

In addition, the threshold may be set to be equal to a level threshold that is between a first level and a second level among the multiple levels. The first level indicates that the battery has the highest remaining capacity, and the second level indicates that the battery has the next highest remaining capacity following the first level. Consequently, it is possible to indicate to the user that the battery remaining capacity is high, and hence to meet the user's expectation.

In the example described above, the backup is performed automatically. Alternatively, it is possible to start the backup manually by a user in a state where digital camera 100 is powered on. In the case where the backup is started manually, the user is considered to have a strong will to back up image data. Therefore, in the case of manual backup, the backup is performed regardless of the battery remaining capacity. This is because that preferentially performing the backup is considered to meet the user's expectation.

Other Exemplary Embodiments

The first exemplary embodiment has been described above as an example of the technique disclosed in the present application. However, the technique according to the present disclosure is not limited to the first exemplary embodiment, but is applicable to other exemplary embodiments including appropriate modifications, replacements, additions, omissions, and the like. In addition, new exemplary embodiments can be made by combining the constituent elements described in the first exemplary embodiment.

In the exemplary embodiment described above, digital camera 100 starts the automatic cloud backup upon receipt of an instruction to start the automatic cloud backup from smartphone 200. Alternatively, digital camera 100 may start the automatic cloud backup based on the setting in digital camera 100, without receiving the start instruction from smartphone 200. For example, digital camera 100 may accept "on" (valid) or "off" (invalid) setting on the automatic cloud backup function. Digital camera 100 may be configured to be in the "second power off" state while the automatic cloud backup function is "on" and to start the automatic cloud backup upon establishment of Wi-Fi connection.

In the exemplary embodiment described above, the electricity input part is the USB interface configured to receive electricity in accordance with the USB standard. However, the electricity input part is not limited to such a USB interface. The electricity input part only needs to be the one including a circuit for receiving electricity from an external device in accordance with a predetermined standard.

In the example of the exemplary embodiment described above, the predetermined recording medium is server 240 on network 230 and data is backed up in server 240. However, the predetermined recording medium is not limited to server 240. Alternatively, the predetermined recording medium may be a recording medium integrated in digital camera 100 or a recording medium connected to digital camera 100 directly rather than via a network, and backup data may be stored in such a recording medium. Examples of the recording medium encompass a hard disk and a semiconductor storage device.

Controller 120 of digital camera 100 may include, instead of the CPU, a graphics processing unit (GPU), a micro processing unit (MPU), a field-programmable gate array (FPGA), or an application specific integrated circuit (ASIC), for example.

In the example of the exemplary embodiment described above, the electronic device is the digital camera. However, the electronic device is not limited to the digital camera. The electronic device only needs to be a device having a function of automatically backing up data and including an integrated battery that is rechargeable externally. Examples of the electronic device encompass a video camera, a smartphone, a tablet terminal, a portable telephone, and a laptop personal computer.

As described above, the exemplary embodiments have been described as examples of a technique according to the present disclosure. The attached drawings and the detailed description have been provided for this purpose.

Therefore, the components described in the attached drawings and the detailed description include not only the components essential for solving the problem but also components that are not essential for solving the problem in order to illustrate the technique. For this reason, even if these unessential components are described in the accompanying drawings and the detailed description, these unessential components should not be immediately approved as being essential.

Further, since the above-described exemplary embodiments illustrate the technique in the present disclosure, various modifications, substitutions, additions, and omissions can be made within the scope of claims and equivalent scope of claims.

The present disclosure is applicable to electronic devices including an integrated battery that is rechargeable and having a function to automatically back up data.

What is claimed is:

1. An electronic device configured to execute automatic backup of automatically transmitting, to a predetermined recording medium, data stored in the electronic device, comprising:
   a battery configured to supply electricity to drive the electronic device, the electricity having been charged in the battery;
   an electricity input part to be connected to an external device, the electricity input part being configured to receive the electricity supplied from the external device;
   a charging controller configured to charge the battery with the electricity having been supplied via the electricity input part; and
   a controller configured to control execution of the automatic backup,
   wherein in a case where the electricity input part is connected to the external device and there is data to be subjected to the automatic backup,
      the controller compares a remaining capacity of the battery with a threshold,
      the controller executes the automatic backup when the remaining capacity of the battery is higher than the threshold, and the controller does not execute the automatic backup when the remaining capacity of the battery is equal to or lower than the threshold, in a case where the remaining capacity of the battery is equal to or lower than the threshold, the controller is configured to transmit a predetermined notification to the charging controller and to stop operating, and in a case where the charging controller has received the predetermined notification, the charging controller is configured to activate the controller upon completion of charging of the battery.

2. The electronic device according to claim 1, wherein, while the remaining capacity of the battery is equal to or lower than the threshold and the automatic backup is not under execution, the charging controller is configured to charge the battery with the electricity having been supplied via the electricity input part.

3. The electronic device according to claim 1, wherein the charging controller is configured such that (a) in a case where the electricity input part is connected to the external device and the controller is operating, the charging controller causes the electricity to be supplied to the controller, the electricity having been supplied via the electricity input part, and (b) in a case where the electricity input part is connected to the external device and the controller is stopped, the charging controller causes the battery to be charged with the electricity having been supplied via the electricity input part.

4. The electronic device according to claim 1, further comprising a display configured to display the remaining capacity of the battery in multiple levels in a stepwise manner, wherein the threshold is set to be equal to a level threshold for the remaining capacity of the battery, the level threshold being to be referred to at the time of switchover among the multiple levels.

5. The electronic device according to claim 4, wherein the threshold is equal to the level threshold that is between a first level and a second level among the multiple levels, the first level indicating that the battery has a highest remaining capacity, and the second level indicating that the battery has a next highest remaining capacity following the first level.

6. The electronic device according to claim 1, further comprising an image capturing part configured to capture an image of a subject and generate image data.

7. The electronic device according to claim 1, wherein the predetermined recording medium is a server connected to a network.

8. The electronic device according to claim 1, wherein the electricity input part includes a circuit connected to the external device in compliance with a universal serial bus (USB) standard.

* * * * *